(12) United States Patent
Akimoto

(10) Patent No.: US 12,416,595 B2
(45) Date of Patent: Sep. 16, 2025

(54) SENSOR

(71) Applicant: KABUSHIKI KAISHA TOSHIBA, Tokyo (JP)

(72) Inventor: Yosuke Akimoto, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 531 days.

(21) Appl. No.: 17/818,225

(22) Filed: Aug. 8, 2022

(65) Prior Publication Data
US 2023/0228697 A1    Jul. 20, 2023

(30) Foreign Application Priority Data
Jan. 18, 2022    (JP) .................................. 2022-005387

(51) Int. Cl.
*G01N 27/12* (2006.01)
(52) U.S. Cl.
CPC .................................. *G01N 27/121* (2013.01)
(58) Field of Classification Search
CPC .... G01N 27/121; G01N 27/12; G01N 27/127; G01N 27/126; G01N 27/125
See application file for complete search history.

(56) References Cited

U.S. PATENT DOCUMENTS

| | | | | |
|---|---|---|---|---|
| 2007/0210807 A1* | 9/2007 | Arisaka | ................ | G01N 27/225 324/664 |
| 2016/0077028 A1* | 3/2016 | Beck | .................... | G01N 27/121 73/335.05 |
| 2018/0299397 A1* | 10/2018 | Yamada | ............... | G01N 27/225 |
| 2019/0086377 A1 | 3/2019 | Ikehashi et al. | | |
| 2021/0293737 A1* | 9/2021 | Lefebvre | ............ | G01N 27/4146 |

FOREIGN PATENT DOCUMENTS

| | | |
|---|---|---|
| JP | H9-331070 A | 12/1997 |
| JP | 2019-56607 A | 4/2019 |

* cited by examiner

*Primary Examiner* — Judy Nguyen
*Assistant Examiner* — Adam S Clarke
(74) *Attorney, Agent, or Firm* — Finnegan, Henderson, Farabow, Garrett & Dunner, LLP

(57) ABSTRACT

According to one embodiment, a sensor includes a first sensor part. The first sensor part includes an insulating member, and first and second element parts. The first element part includes a first resistance element including first and first other resistance end portions, and covered with the insulating member, a first electrode electrically connected to the first resistance end portion, and not covered with the insulating member, and a first other electrode electrically connected to the first other resistance end portion, and not covered with the insulating member. The second element part includes a second resistance element including and second other resistance end portions, and covered with the insulating member, a second electrode electrically connected to the second resistance end portion, and not covered with the insulating member, and a second other electrode electrically connected to the second other resistance end portion, and not covered with the insulating member.

19 Claims, 12 Drawing Sheets

SENSOR

CROSS-REFERENCE TO RELATED APPLICATIONS

This application is based upon and claims the benefit of priority from Japanese Patent Application No. 2022-005387, filed on Jan. 18, 2022; the entire contents of which are incorporated herein by reference.

FIELD

Embodiments described herein relate generally to a sensor.

BACKGROUND

For example, it is desired to improve the detection performance of the sensor.

DETAILED DESCRIPTION

Figure 1:
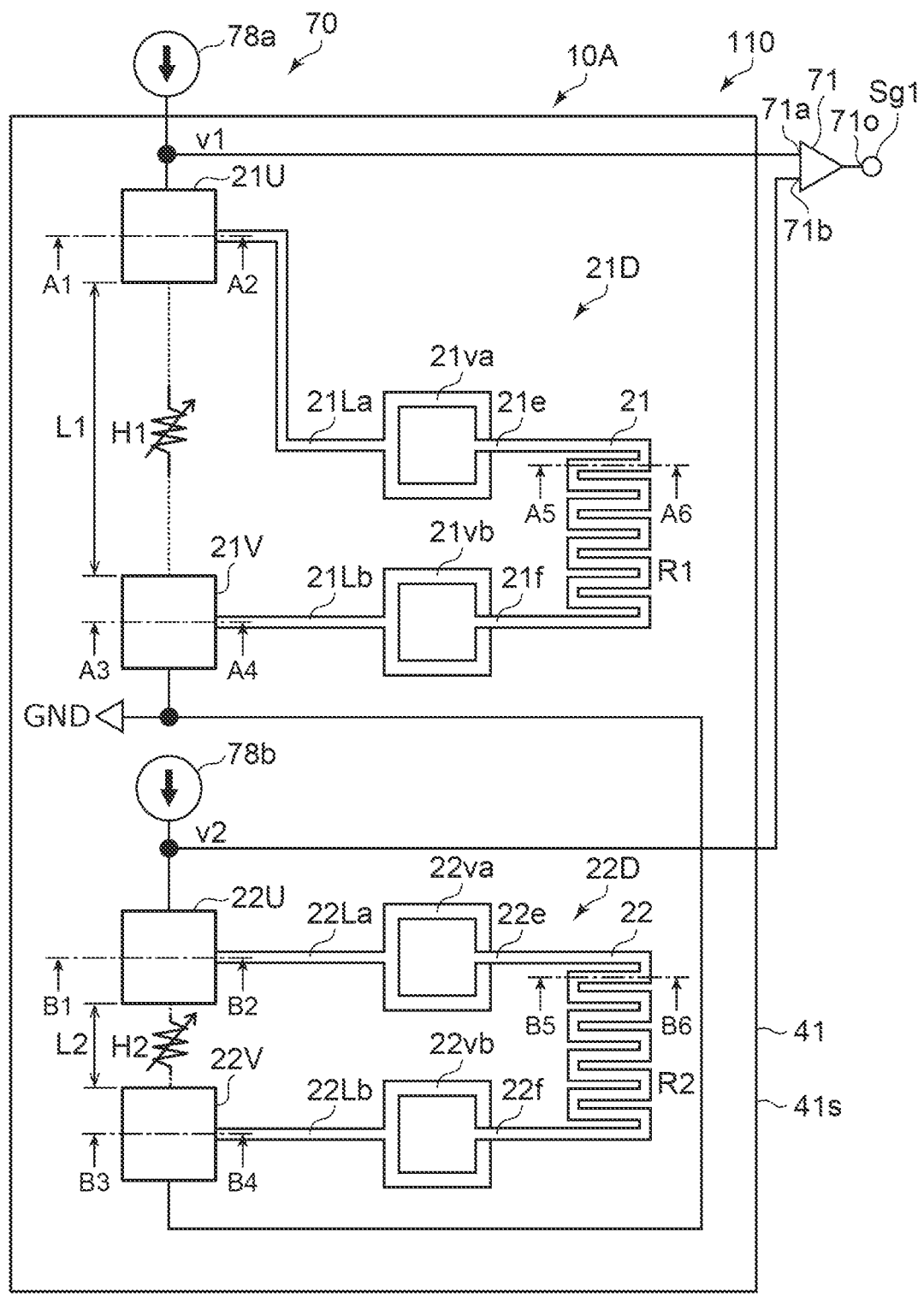
FIG. 1 is a schematic plan view illustrating a sensor according to a first embodiment.

According to one embodiment, a sensor includes a first sensor part. The first sensor part includes an insulating member, a first element part, and a second element part. The first element part includes a first resistance element including a first resistance end portion and a first other resistance end portion, and covered with the insulating member, a first electrode electrically connected to the first resistance end portion, and not covered with the insulating member, and a first other electrode electrically connected to the first other resistance end portion, and not covered with the insulating member. The second element part includes a second resistance element including a second resistance end portion and a second other resistance end portion, and covered with the insulating member, a second electrode electrically connected to the second resistance end portion, and not covered with the insulating member, and a second other electrode electrically connected to the second other resistance end portion, and not covered with the insulating member. A second distance between the second electrode and the second other electrode is shorter than a distance between the first electrode and the first other electrode.

According to one embodiment, a sensor includes a first sensor part. The first sensor part includes an insulating member, a first element part, and a second element part. The first element part includes a first resistance element including a first resistance end portion and a first other resistance end portion, and covered with the insulating member, a first electrode electrically connected to the first resistance end portion, and not covered with the insulating member, and a first other electrode electrically connected to the first other resistance end portion, and not covered with the insulating member. The second element part includes a second resistance element including a second resistance end portion and a second other resistance end portion, and covered with the insulating member, a second electrode electrically connected to the second resistance end portion, and not covered with the insulating member, and a second other electrode electrically connected to the second other resistance end portion, and not covered with the insulating member. The insulating member includes a first insulating region between the first electrode and the first other electrode, and a second insulating region between the second electrode and the second other electrode. The insulating member includes a first material of the first insulating region, and a first contact angle of the first insulating region with respect to water. The insulating member includes at least any one of a second material of the second insulating region, the second material being different from the first material, or a second contact angle of the second insulating region with respect to water, the second contact angle being smaller than the first contact angle.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to a first embodiment.

FIGS. 2A to 2F are schematic cross-sectional views illustrating the sensor according to the first embodiment.

Figure 2A:
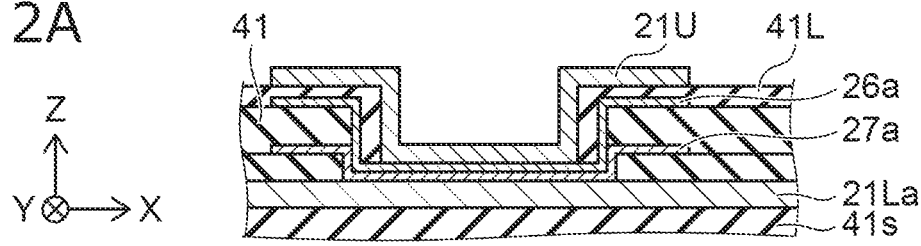
FIGS. 2A to 2F are schematic cross-sectional views illustrating the sensor according to the first embodiment.
Figure 2B:
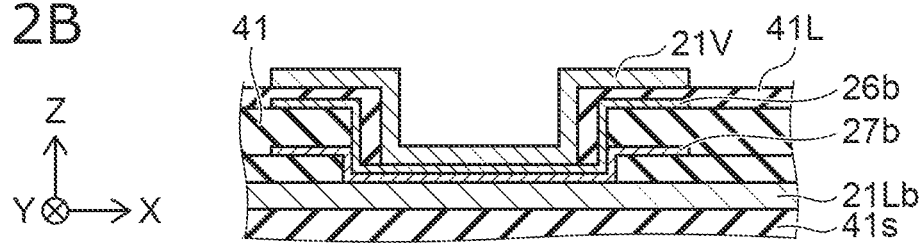
Figure 2C:
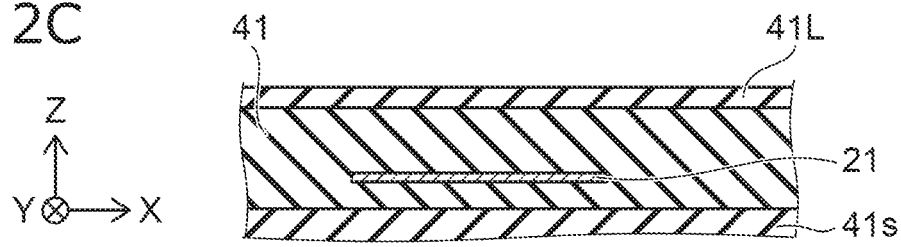
Figure 2D:
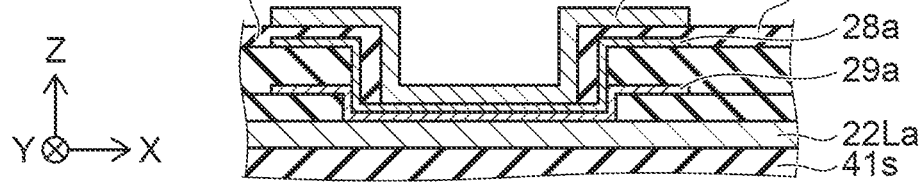
Figure 2E:
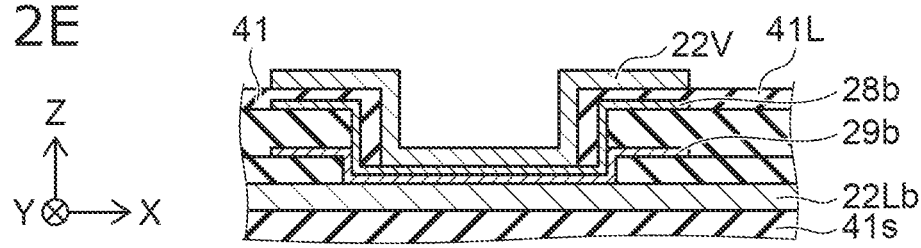
Figure 2F:
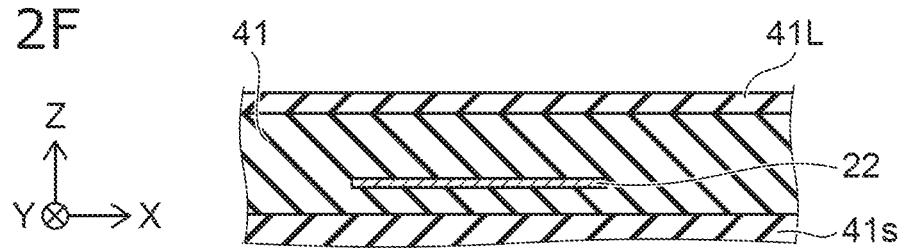

FIG. 2A is a cross-sectional view taken along the line A1-A2 of FIG. 1. FIG. 2B is a cross-sectional view taken along the line A3-A4 of FIG. 1. FIG. 2C is a sectional view taken along line A5-A6 of FIG. 1. FIG. 2D is a sectional view taken along line B1-B2 of FIG. 1. FIG. 2E is a sectional view taken along line B3-B4 of FIG. 1. FIG. 2F is a sectional view taken along line B5-B6 of FIG. 1.

As shown in FIG. 1, a sensor 110 according to the embodiment includes a first sensor part 10A. The first sensor part 10A includes an insulating member 41, a first element part 21D, and a second element part 22D.

As shown in FIGS. 2A to 2F, the insulating member 41 may include, for example, a substrate 41s and an insulating layer 41L or the like. A part of the substrate 41s may include a semiconductor layer such as a silicon substrate. For example, an insulating layer may be provided on the surface of the silicon substrate or the like, and various conductive layers may be provided on the insulating layer. The insulating layer 41L may be provided on those conductive layers. In FIG. 1, the insulating layer 41L is omitted.

As shown in FIG. 1, the first element part 21D includes a first resistance element 21, a first electrode 21U, and a first other electrode 21V. The first resistance element 21 includes a first resistance end portion 21e and a first other resistance end portion 21f. As shown in FIG. 2C, the first resistance element 21 is covered with the insulating member 41.

As shown in FIG. 1, the first electrode 21U is electrically connected to the first resistance end portion 21e. As shown in FIG. 2A, the first electrode 21U is not covered with the insulating member 41.

As shown in FIG. 1, the first other electrode 21V is electrically connected to the first other resistance end portion 21f. As shown in FIG. 2B, the first other electrode 21V is not covered with the insulating member 41.

In this example, the first sensor part 10A includes a first electrode wiring 21La and a first other electrode wiring 21Lb. The first electrode wiring 21La electrically connects the first resistance end portion 21e to the first electrode 21U. In this example, the first electrode wiring 21La is electrically connected to the first resistance end portion 21e via a via 21va. The first other electrode wiring 21Lb electrically connects the first other resistance end portion 21f to the first other electrode 21V. In this example, the first other electrode wiring 21Lb is electrically connected to the first other resistance end portion 21f via a via 21vb.

As shown in FIG. 1, the second element part 22D includes a second resistance element 22, a second electrode 22U, and a second other electrode 22V. The second resistance element 22 includes a second resistance end portion 22e and a second other resistance end portion 22f. As shown in FIG. 2F, the second resistance element 22 is covered with the insulating member 41.

As shown in FIG. 1, the second electrode 22U is electrically connected to the second resistance end portion 22e. As shown in FIG. 2D, the second electrode 22U is not covered with the insulating member 41.

As shown in FIG. 1, the second other electrode 22V is electrically connected to the second other resistance end portion 22f. As shown in FIG. 2E, the second other electrode 22V is not covered with the insulating member 41.

In this example, the first sensor part 10A includes a second electrode wiring 22La and a second other electrode wiring 22Lb. The second electrode wiring 22La electrically connects the second resistance end portion 22e to the second electrode 22U. In this example, the second electrode wiring 22La is electrically connected to the second resistance end portion 22e via a via 22va. The second other electrode wiring 22Lb electrically connects the second other resistance end portion 22f to the second other electrode 22V. In this example, the second other electrode wiring 22Lb is electrically connected to the second other resistance end portion 22f via a via 22vb.

At least any one of the first electrode wiring 21La, the first other electrode wiring 21Lb, the second electrode wiring 22La, or the second other electrode wiring 22Lb is a low resistance wiring. For example, at least any one of the first electrode wiring 21La, the first other electrode wiring 21Lb, the second electrode wiring 22La, or the second other electrode wiring 22Lb includes Al.

As shown in FIG. 1, in the embodiment, a distance between the first electrode 21U and the first other electrode 21V is defined as a first distance L1. A distance between the second electrode 22U and the second other electrode 22V is defined as a second distance L2. The second distance L2 is shorter than the first distance L1.

As shown in FIG. 1, for example, a parasitic resistance between the first electrode 21U and the first other electrode 21V is defined as a first parasitic resistance H1. A first electrical resistance Rp1 between the first electrode 21U and the first other electrode 21V corresponds to a resistance of a parallel circuit including the first parasitic resistance H1 and an electrical resistance R1 of the first resistance element 21.

A parasitic resistance between the second electrode 22U and the second other electrode 22V is defined as a second parasitic resistance H2. A second electrical resistance Rp2 between the second electrode 22U and the second other electrode 22V corresponds to a resistance of a parallel circuit including the second parasitic resistance H2 and the electrical resistance R2 of the second resistance element 22.

The second parasitic resistance H2 is affected by, for example, water adhering to the surface in the region between the second electrode 22U and the second other electrode 22V. For example, the second parasitic resistance H2 changes according to a change in humidity of the space around the first sensor part 10A. When the humidity is high, the parasitic resistance is low. When the humidity is low, the parasitic resistance is high. Therefore, the second electrical resistance Rp2 (parallel resistance) between the second electrode 22U and the second other electrode 22V changes according to the change in humidity of the space around the first sensor part 10A.

On the other hand, the first electrical resistance Rp1 (parallel resistance) between the first electrode 21U and the first other electrode 21V does not substantially change according to a change in humidity. Alternatively, a first rate of change with respect to the change in humidity of the first electrical resistance Rp1 is lower than a second rate of change with respect to the change in humidity of the second electrical resistance Rp2. The first electrical resistance Rp1 (parallel resistance) is substantially the same as, for example, the electrical resistance R2 of the second resistance element 22.

For example, by detecting such a difference between the first electrical resistance Rp1 and the second electrical resistance Rp2, humidity can be detected with high accuracy. According to the embodiment, it is possible to provide a sensor capable of improving the detection performance. For example, differential detection cancels temperature dependence of the electrical resistance R1 and the electrical resistance R2. For example, it is possible to provide a sensor whose characteristics change depending on changes in humidity.

As shown in FIGS. 2A to 2F, the substrate 41s spreads along an X-Y plane. A direction from the substrate 41s to the first electrode 21U is along a Z-axis direction. The Z-axis direction is perpendicular to an X-axis direction and a Y-axis direction. The Y-axis direction is perpendicular to the X-axis direction.

As shown in FIG. 1, the sensor 110 may include a controller 70. The controller 70 includes, for example, a first supply circuit 78a, a second supply circuit 78b, and a differential circuit 71. The first supply circuit 78a supplies a first current to the first resistance element 21 via the first electrode 21U and the first other electrode 21V. The second supply circuit 78b supplies a second current to the second resistance element 22 via the second electrode 22U and the second other electrode 22V. The first supply circuit 78a and the second supply circuit 78b are, for example, constant current sources.

The differential circuit 71 includes a first input part 71a, a second input part 71b, and an output part 71o. A first voltage v1 between the first electrode 21U and the first other electrode 21V is input to the first input part 71a. A second voltage v2 between the second electrode 22U and the second other electrode 22V is input to the second input part 71b. The output part 71o outputs a first signal Sg1 according to a difference between the first voltage v1 and the second voltage v2.

The first signal Sg1 includes information about humidity. For example, the humidity when the absolute value of the first signal Sg1 is large is higher than the humidity when the absolute value of the first signal Sg1 is small.

For example, the electrical resistance R1 of the first resistance element 21 may be substantially the same as the electrical resistance R2 of the second resistance element 22. For example, the electrical resistance R1 of the first resistance element 21 is not less than 0.9 times and not more than 1.1 times the electrical resistance R2 of the second resistance element 22. Since these electrical resistances are substantially the same, the component corresponding to humidity becomes large in the first signal Sg1. Humidity is detected with higher accuracy.

As shown in FIGS. 2A, 2B, 2D and 2E, the first electrode wiring 21La, the first other electrode wiring 21Lb, the second electrode wiring 22La and the second other electrode wiring 22Lb may be covered with the insulating member 41.

The first resistance element 21 may be formed of, for example, at least any one of a conductive layer 26a, a conductive layer 27a, a conductive layer 26b, or a conductive layer 27b (see FIGS. 2A and 2B). The second resistance element 22 may be formed of, for example, at least any one of a conductive layer 28a, a conductive layer 29a, a conductive layer 28b, or a conductive layer 29b (see FIGS. 2D and 2E). For example, at least any one of the first resistance element 21 and the second resistance element 22 includes TiN. It is easy to obtain a resistance of an appropriate value.

In one example, at least any one of the first electrode 21U, the first other electrode 21V, the second electrode 22U or the second other electrode 22V includes at least one selected from the group consisting of Pd, Au, Pt and Al. For example, at least any one of the surface portions of the first electrode 21U, the first other electrode 21V, the second electrode 22U, or the second other electrode 22V includes at least one selected from the group consisting of Pd, Au, Pt, and Al. Corrosion and the like can be suppressed in these electrodes exposed to the outside. For example, stable characteristics can be easily obtained. These electrodes are, for example, electrode pads.

The insulating member 41 includes, for example, silicon, and at least one selected from the group consisting of oxygen and nitrogen. The insulating member 41 includes, for example, at least any one of silicon nitride, silicon oxide or silicon oxynitride.

In the following, an example of the experimental results conducted by the inventor will be described.

In the experiment, a capacitive element with two electrodes, and two electrodes connected to those electrodes are provided on the substrate. The impedance between the two electrodes is measured by changing the humidity of the surrounding environment.

Figure 3A:
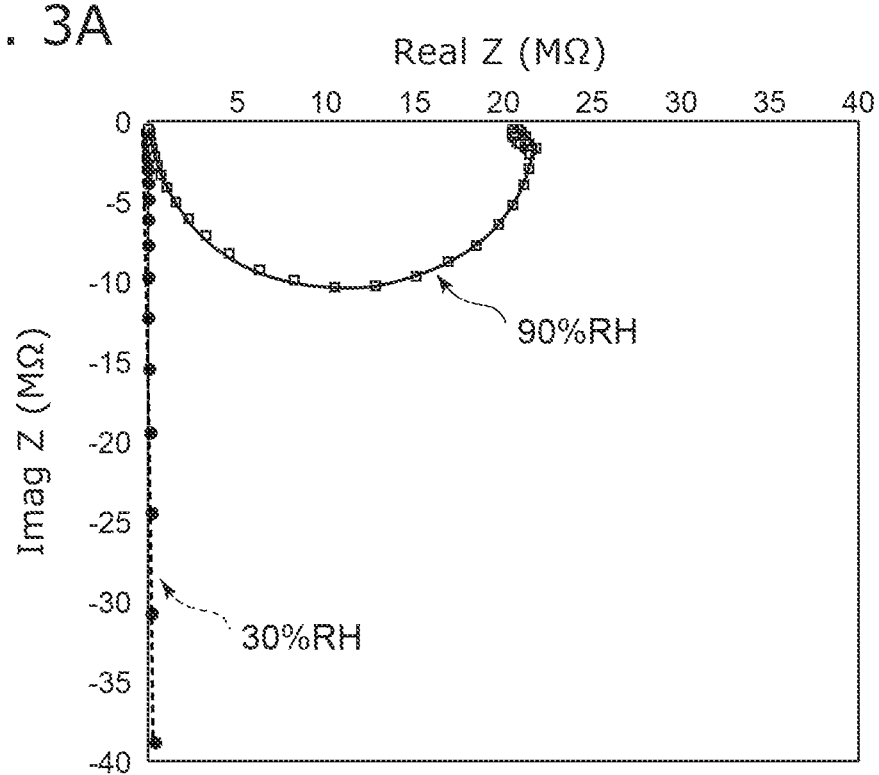
FIGS. 3A and 3B are graphs illustrating experimental results.
Figure 3B:
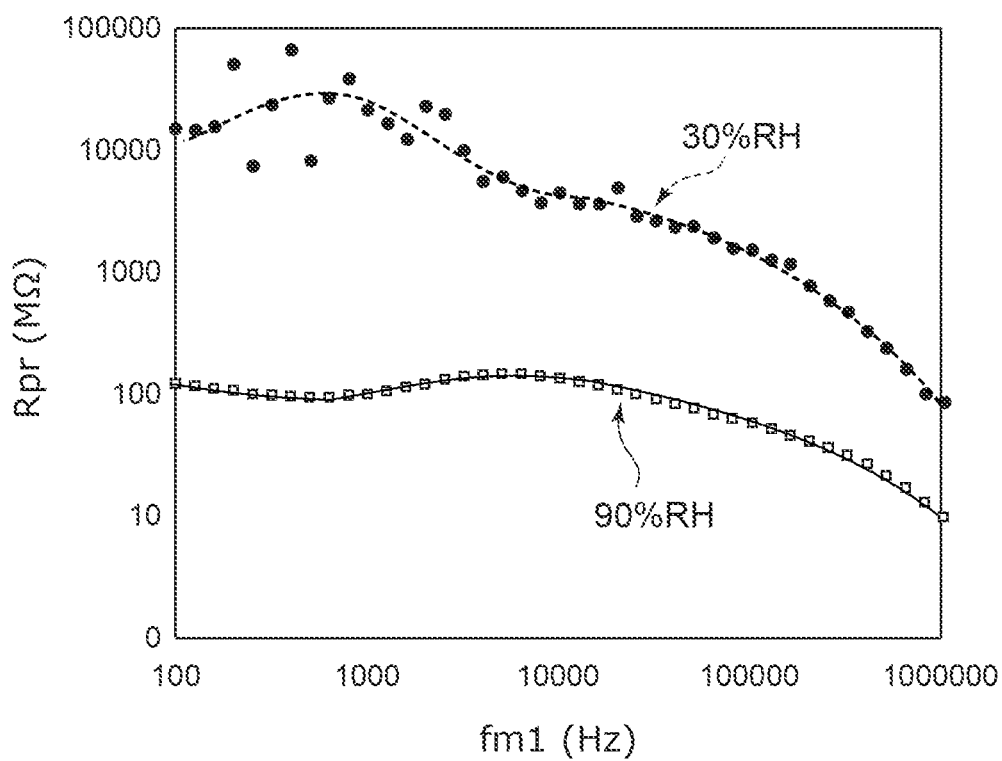

FIGS. 3A and 3B are graphs illustrating experimental results.

The horizontal axis of FIG. 3A is a real number component of impedance "Real Z". The vertical axis is an imaginary number component of impedance "Imag Z". As shown in FIG. 3A, when the humidity is 30% RH, the real number component "Real Z" is substantially zero. In this case, the impedance between the two electrodes is only the capacitive component. On the other hand, when the humidity is 90% RH, the real number component "Real Z" is generated. In this case, the impedance between the two electrodes is the impedance of the parallel circuit of the capacitance component and the resistance component.

The horizontal axis of FIG. 3B is a frequency fm1 in the measurement of impedance. The vertical axis is a parallel resistance component Rpr. When the humidity is 30% RH, the parallel resistance component Rpr is high. On the other hand, when the humidity is 90% RH, the parallel resistance component Rpr decreases.

In this way, the resistance component between the two electrodes changes depending on humidity. Humidity can be detected by utilizing this characteristic.

In the following, an example of the simulation result regarding the electrical resistance R2 of the second resistance element 22 and the second parasitic resistance H2 between the second electrode 22U and the second other electrode 22V will be described.

Figure 4A:
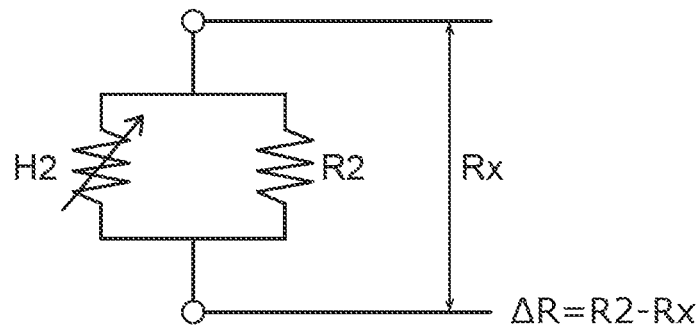
FIGS. 4A and 4B are schematic views illustrating simulation results.
Figure 4B:
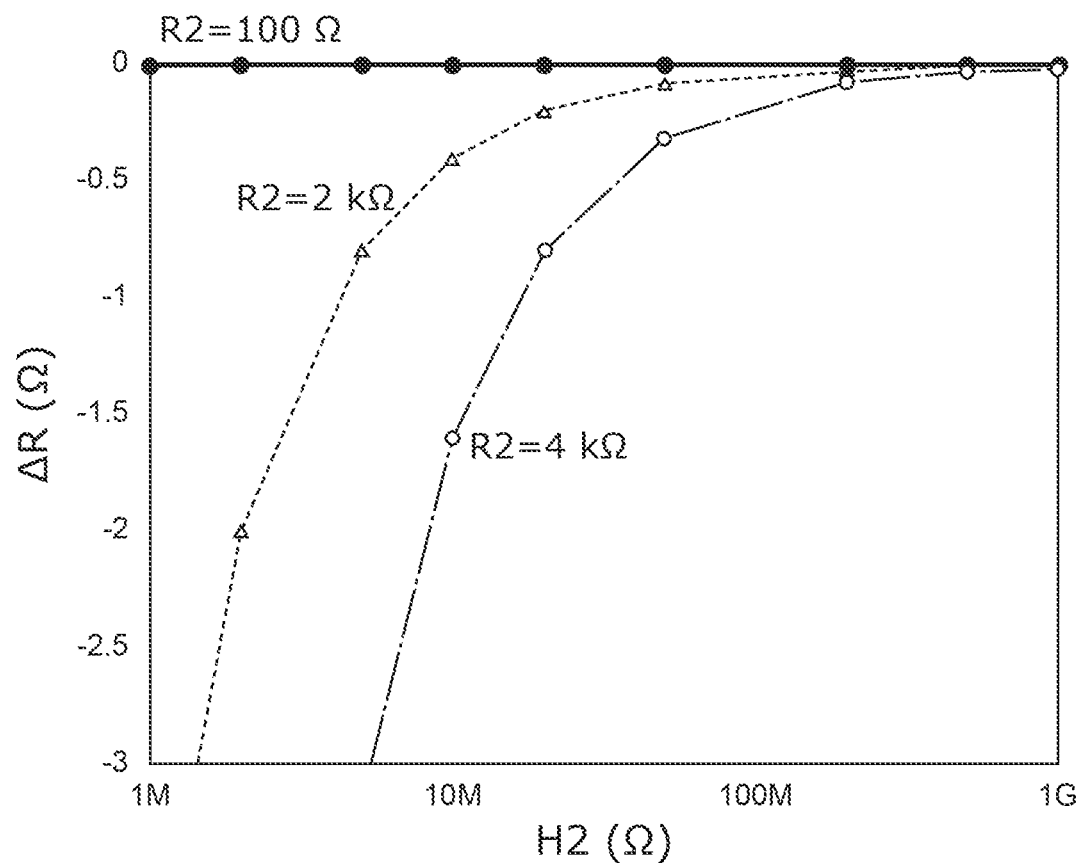

FIGS. 4A and 4B are schematic views illustrating simulation results.

FIG. 4A illustrates a simulation model. FIG. 4B illustrates the simulation results. As shown in FIG. 4A, in the simulation model, the electrical resistance R2 of the second resistance element 22 and the second parasitic resistance H2 between the second electrode 22U and the second other electrode 22V are connected in parallel. A combined resistance of the parallel circuit is defined as a resistance Rx.

The horizontal axis of FIG. 4B is the second parasitic resistance H2 between the second electrode 22U and the second other electrode 22V. The vertical axis is a resistance change ΔR. The resistance change ΔR is a difference between the electrical resistance R2 and the resistance Rx. As shown in FIG. 4B, when the electrical resistance R2 of the second resistance element 22 is as low as 100Ω, the resistance change ΔR is substantially 0 even if the second parasitic resistance H2 changes. When the electrical resistance R2 of the second resistance element 22 becomes as high as 2 kΩ or 4 kΩ, the resistance change ΔR changes with a change of the second parasitic resistance H2. As described above, the second parasitic resistance H2 changes depending on humidity.

In the embodiment, the electrical resistance R2 of the second resistance element 22 is preferably not less than 1 kΩ and not more than 20 kΩ, for example. This makes it easy to detect changes in humidity appropriately and with high accuracy. As described above, it is preferable that the electrical resistance R1 of the first resistance element 21 is substantially the same as the electrical resistance R2. Therefore, the electrical resistance R1 of the first resistance element 21 is preferably not less than 1 kΩ not more than and 20 kΩ.

As described below, the second electrode 22U and the second other electrode 22V may be comb-shaped electrodes.

Figure 5A:
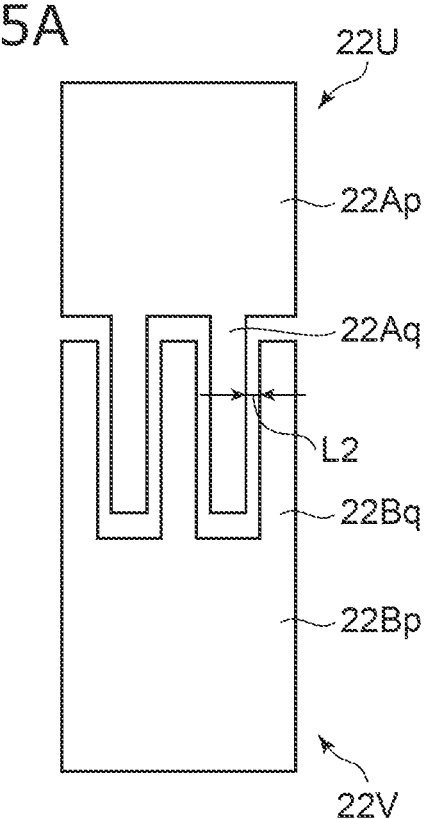
FIGS. 5A and 5B are schematic plan views illustrating the sensor according to the first embodiment.
Figure 5B:
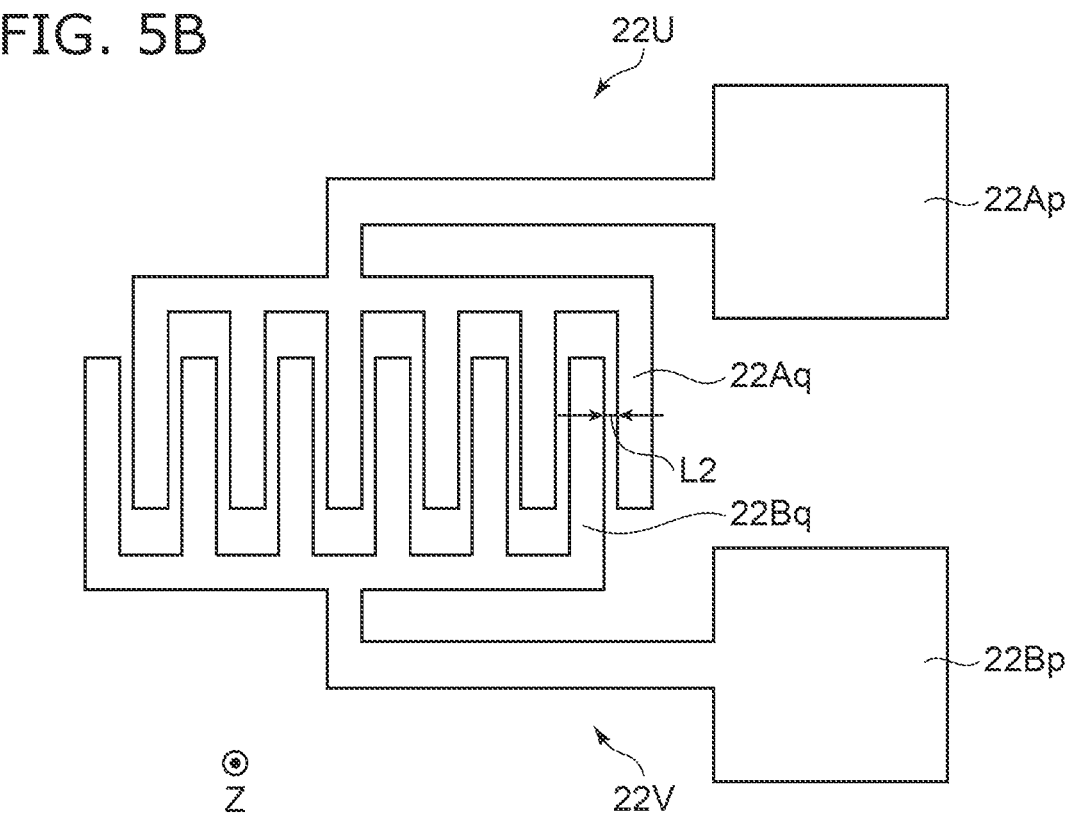

FIGS. 5A and 5B are schematic plan views illustrating the sensor according to the first embodiment.

As shown in FIGS. 5A and 5B, the second electrode 22U includes a second electrode base 22Ap and multiple second electrode protrusions 22Aq. The multiple second electrode protrusions 22Aq are electrically connected to the second electrode base 22Ap. At least a part of the second other electrode 22V is between one of the multiple second electrode protrusions 22Aq and another one of the multiple second electrode protrusions 22Aq.

In these examples, the second other electrode 22V includes a second other electrode base 22Bp and a multiple second other electrode protrusions 22Bq. The multiple second other electrode protrusions 22Bq are electrically connected to the second other electrode base 22Bp. One of the multiple second electrode protrusions 22Aq is between one of the multiple second other electrode protrusions 22Bq and another one of the multiple second other electrode protrusions 22Bq.

Due to the comb-shaped electrode, the second parasitic resistance H2 between the second electrode 22U and the second other electrode 22V is likely to change with higher sensitivity to changes in humidity. Due to the comb-shaped electrode, the second electric resistance Rp2 (parallel resistance) between the second electrode 22U and the second other electrode 22V is likely to change with higher sensitivity to changes in humidity.

Second Embodiment

A sensor according to a second embodiment also includes the first sensor part 10A (see FIG. 1). Also in the second embodiment, the first sensor part 10A includes the insulating member 41, the first element part 21D, and the second element part 22D (see FIG. 1). Also in the second embodiment, the first element part 21D includes the first resistance element 21, the first electrode 21U, and the first other electrode 21V (see FIG. 1). Also in the second embodiment, the second element part 22D includes the second resistance element 22, the second electrode 22U, and the second other electrode 22V (see FIG. 1). In the second embodiment, characteristics in the region between the second electrode 22U and the second other electrode 22V are different from characteristics in a region between the first electrode 21U and the first other electrode 21V. In the following, an example of the characteristics between these electrodes will be described with respect to the second embodiment.

Figure 6A:
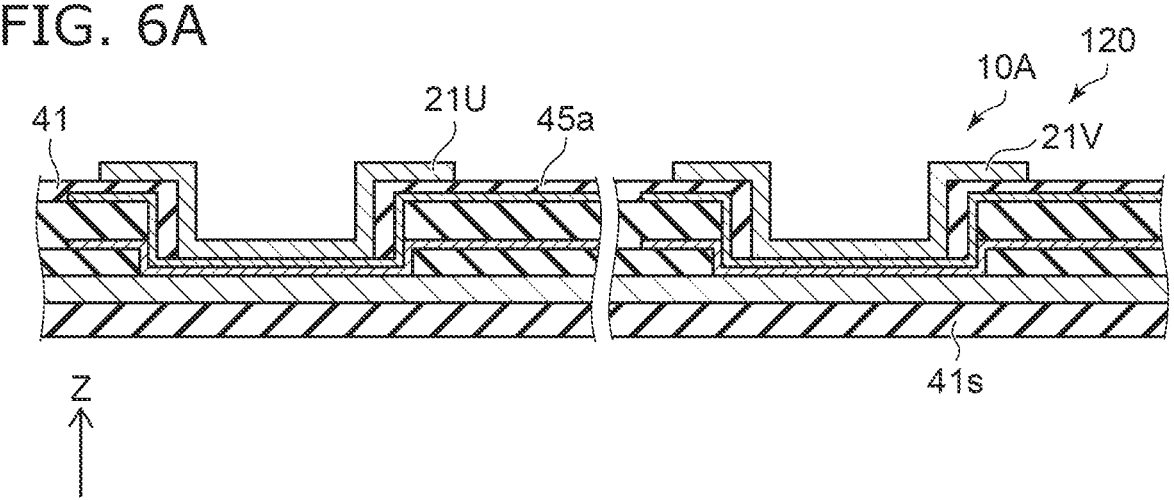
FIGS. 6A and 6B are schematic cross-sectional views illustrating a sensor according to a second embodiment.
Figure 6B:
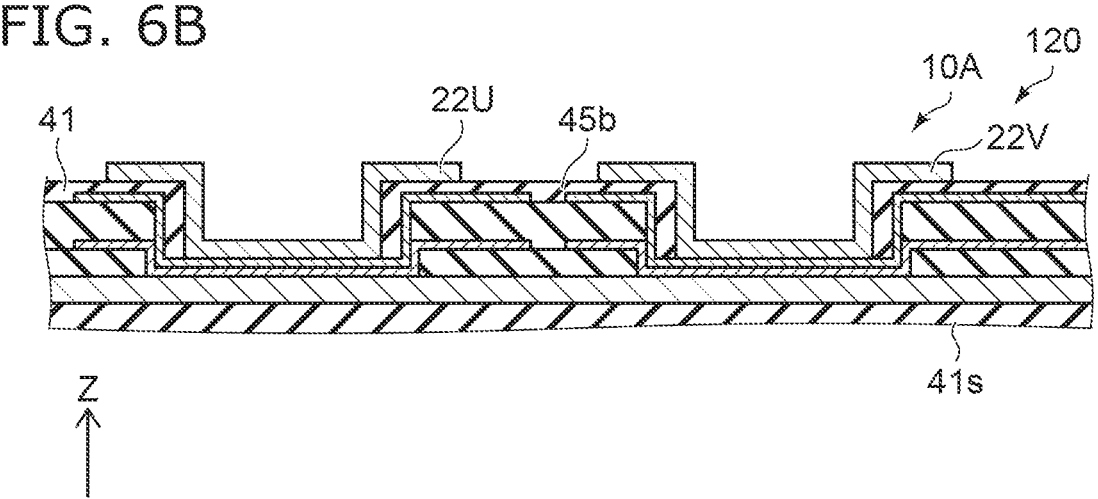

FIGS. 6A and 6B are schematic cross-sectional views illustrating a sensor according to a second embodiment.

As shown in FIG. 6A, in a sensor 120, the insulating member 41 includes a first insulating region 45a between the first electrode 21U and the first other electrode 21V. As shown in FIG. 6B, the insulating member 41 includes a second insulating region 45b between the second electrode 22U and the second other electrode 22V.

The insulating member 41 has a first material of the first insulating region 45a and a first contact angle of the first insulating region 45a with respect to water. The insulating member 41 has at least any one of a second material of the second insulating region 45b and a second contact angle of the second insulating region 45b with respect to water. The second material is different from the first material. The second contact angle is smaller than the first contact angle. Except for this, at least a part of the configuration of the sensor 120 may be the same as the configuration of the sensor 110.

For example, the first insulating region 45a includes the first material. The second insulating region 45b includes the second material. The second material is different from the first material. For example, the contact angle of the second insulating region 45b with water is smaller than the contact angle of the first insulating region 45a with water.

As described above, the materials and surface characteristics of the first insulating region 45a and the second insulating region 45b are different from each other. This causes the electrical resistance between these electrodes to change with humidity. Humidity can be detected by detecting a change in a value (e.g., voltage) corresponding to the electrical resistance between these electrodes.

In the second embodiment, the first distance L1 between the first electrode 21U and the first other electrode 21V may be different from or the same as the second distance L2 between the second electrode 22U and the second other electrode 22V (see FIG. 1).

In the sensor 120, for example, the contact angle of the second material with water is smaller than the contact angle of the first material with water. In the first material, for example, hydrophobicity (for example, water repellency) is high. In the second material, for example, the hydrophilicity is high. The first material may include at least any one of fluorine or an alkyl group. The alkyl group may include, for example, a methyl group. The first material may include, for example, polydimethylsiloxane (PDMS) and the like.

A difference in characteristics between the first insulating region 45a and the second insulating region 45b may be provided due to a difference in surface treatment. For example, the hydrophilicity is increased by irradiation with electromagnetic waves such as ultraviolet rays. For example, treatment with particles or the like increases hydrophilicity. For example, the contact angle can be changed by treatment with a surface modifier (for example, a silane coupling agent). This makes it possible to obtain a difference in the change in parasitic resistance according to the change in humidity.

Third Embodiment

Figure 7:
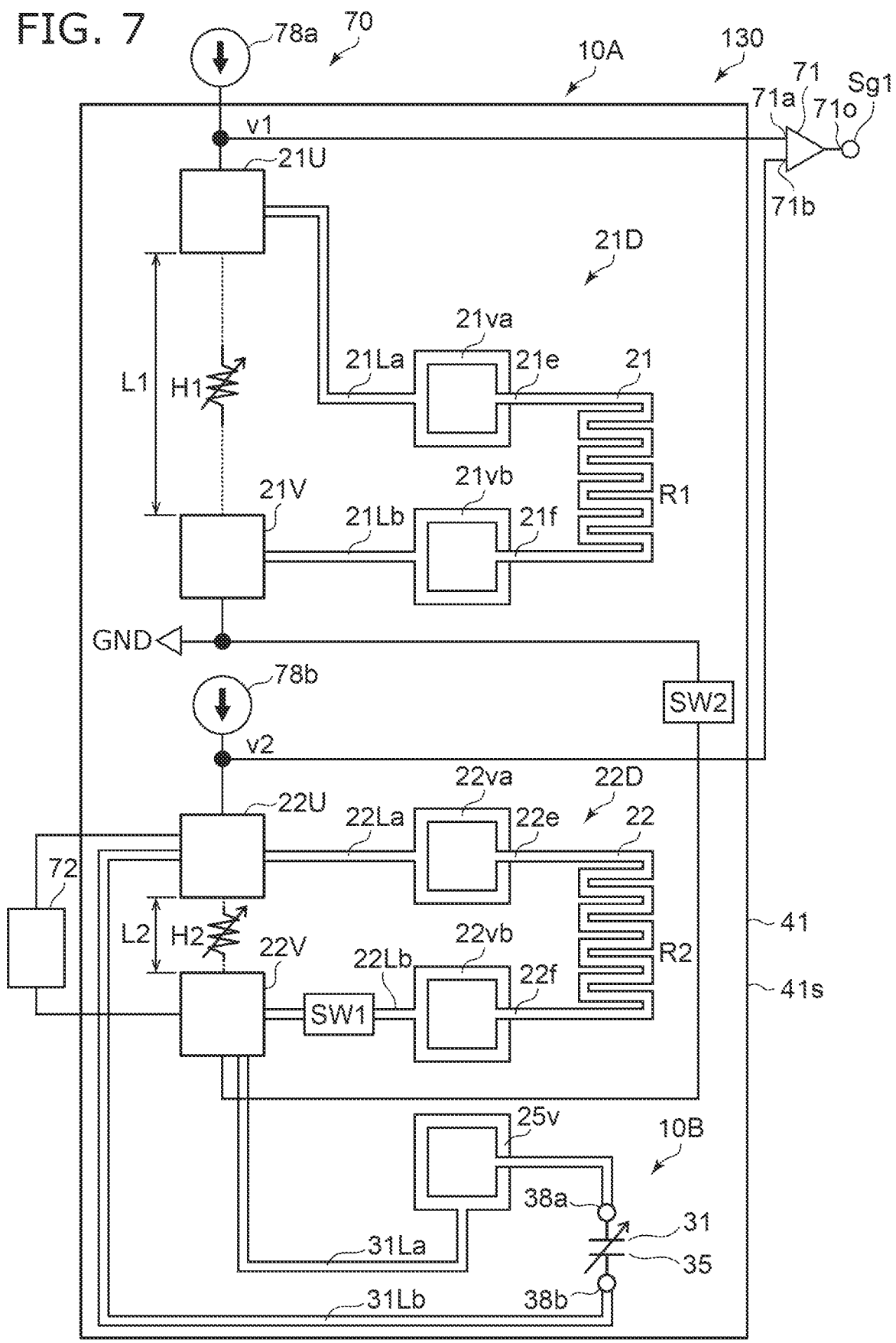
FIG. 7 is a schematic plan view illustrating a sensor according to a third embodiment.

FIG. 7 is a schematic plan view illustrating a sensor according to a third embodiment.

Figure 8:
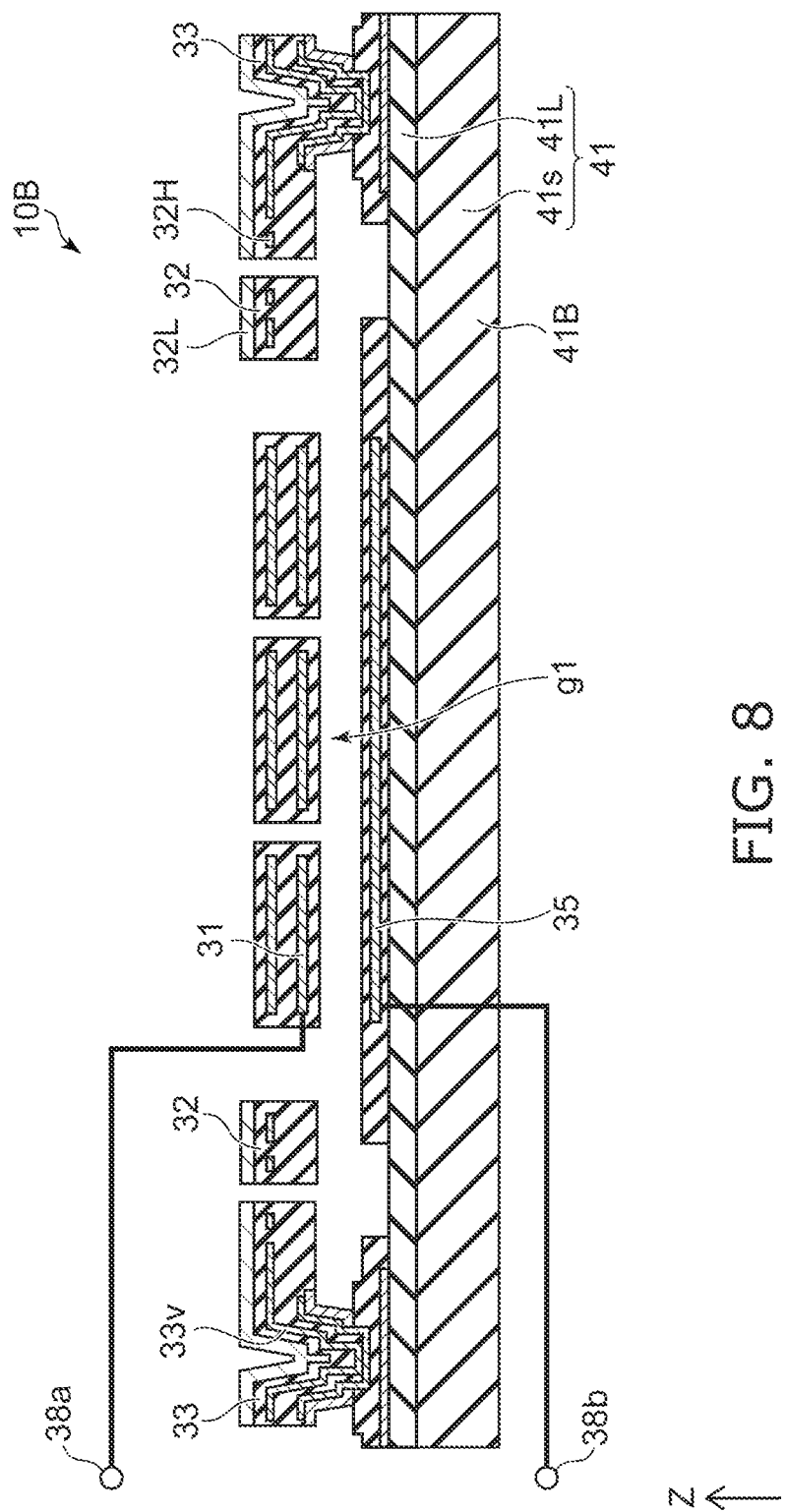
FIG. 8 is a schematic cross-sectional view illustrating a part of the sensor according to the third embodiment.

FIG. 8 is a schematic cross-sectional view illustrating a part of the sensor according to the third embodiment.

As shown in FIG. 7, a sensor 130 according to the embodiment further includes a second sensor part 10B in addition to the first sensor part 10A. In the sensor 130, the configuration of the first sensor part 10A may be the same as the configuration of the first sensor part 10A in the sensor 110 or the sensor 120.

As shown in FIG. 8, the second sensor part 10B includes a base body 41B, a fixed electrode 35, a support portion 33, and a movable electrode 31. The fixed electrode 35 is fixed to the base body 41B. The support portion 33 is fixed to the base body 41B. The movable electrode 31 is supported by the support portion 33. A first void g1 is provided between the fixed electrode 35 and the movable electrode 31.

The base body 41B may be continuous with the substrate 41s. The base body 41B may be provided separately from the substrate 41s.

In this example, the second sensor part 10B further includes a connection portion 32. The connection portion 32 is supported by the support portion 33. The connection portion 32 supports the movable electrode 31.

A first value corresponding to the capacitance between the fixed electrode 35 and the movable electrode 31 changes depending on a substance to be detected included in a space around the second sensor part 1013. The substance to be detected is, for example, hydrogen.

For example, the connection portion 32 can be deformed according to a concentration of the substance to be detected included in the space. For example, a substance adsorption layer 32L is provided on the connection portion 32. The substance adsorption layer 32L expands according to the degree of adsorption of the substance. The connection portion 32 is deformed by the deformation of the substance adsorption layer 32L. A distance between the movable electrode 31 and the fixed electrode 35 changes according to the deformation of the connection portion 32. By measuring the capacitance according to the change in distance, the concentration of the substance to be detected can be detected.

As shown in FIG. 8, the connection portion 32 may include a heater 32H. The connection portion 32 is locally heated by the heater 32H. As a result, the water adsorbed on the substance adsorption layer 32L (for example, the gas sensitive film) can be released. For example, oxygen adsorbed on the substance adsorption layer 32L can be efficiently reduced in a reducing gas atmosphere such as hydrogen.

The movable electrode 31 illustrated in FIG. 8 may be the same layer as any one of multiple of conductive layers (conductive layer 26a, conductive layer 27a, conductive layer 26b, conductive layer 27b, conductive layer 28a, conductive layer 29a, conductive layer 28b, and conductive layer 29b, and the like) described with respect to FIGS. 2A to 2F. The heater 32H may be the same layer as any one of the multiple conductive layers described with respect to FIGS. 2A to 2F.

In the sensor 130, the controller 70 further includes a capacitance detector 72. The capacitance detector 72 can detect the capacitance between the fixed electrode 35 and the movable electrode 31. For example, the capacitance detector 72 can output the first value corresponding to the capacitance between the fixed electrode 35 and the movable electrode 31. The controller 70 can output a second value obtained by correcting the first value using the first signal Sg1.

As shown in FIGS. 7 and 8, in the second sensor part 10B, a movable electrode terminal 38a and a fixed electrode terminal 38b are provided. The movable electrode terminal 38a is electrically connected to the movable electrode 31. The fixed electrode terminal 38b is electrically connected to the fixed electrode 35. For example, the movable electrode terminal 38a is electrically connected to the second other electrode 22V via a wiring 31La and a via 25v. The fixed electrode terminal 38b is electrically connected to the second electrode 22U by a wiring 31Lb.

The capacitance between the fixed electrode 35 and the movable electrode 31 is detected by the capacitance detector 72 via the second electrode 22U and the second other electrode 22V. In order to reduce the size of the sensor 130, the second distance L2 between the second electrode 22U and the second other electrode 22V may be set short. In this case, in the measurement of the capacitance between the fixed electrode 35 and the movable electrode 31, the influence of the second parasitic resistance H2 between the second electrode 22U and the second other electrode 22V occurs. In the embodiment, the first value of the capacitance measurement is corrected by using the first signal Sg1 corresponding to the change of the second parasitic resistance H2. High accuracy can be obtained in the corrected second value.

As shown in FIG. 7, in this example, a first switch SW1 is provided in a current path (second other electrode wiring 22Lb) between the second other electrode 22V and the second resistance element 22. As shown in FIG. 7, for example, the first other electrode 21V is set to the fixed potential GND. The fixed potential GND is, for example, a ground potential. In this example, a second switch SW2 is provided in a current path between the first other electrode 21V and the second other electrode 22V. Multiple operations may be performed on the sensor 130 by operating these switches.

Figure 9:
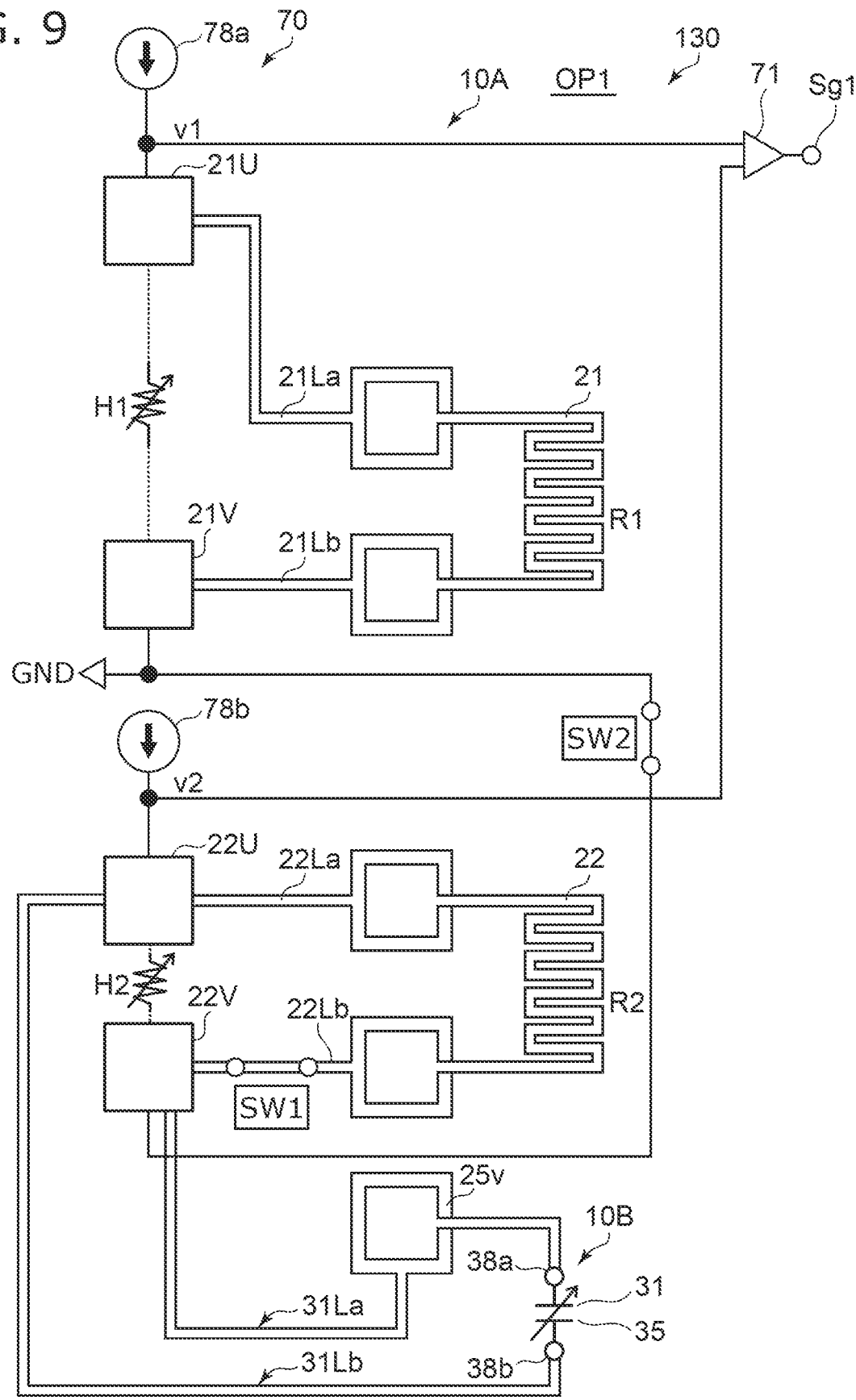
FIG. 9 is a schematic plan view illustrating one of multiple operations in the sensor according to the third embodiment.

FIG. 9 is a schematic plan view illustrating one of multiple operations in the sensor according to the third embodiment.

FIG. 9 corresponds to a first operation OP1. The first operation OP1 corresponds to, for example, a resistance measurement mode. As shown in FIG. 9, in the first operation OP1, the first switch SW1 and the second switch SW2 are in a conductive state. At this time, the second resistance element 22 is connected to the second other electrode 22V, and the second other electrode 22V is set to the fixed potential GND. In this first operation OP1, for example, the operation described with respect to the sensor 110 is performed. For example, the differential circuit 71 outputs the first signal Sg1 according to the difference between the first voltage v1 related to the first resistance element 21 and the second voltage v2 related to the second resistance element 22. That is, humidity is detected.

Figure 10:
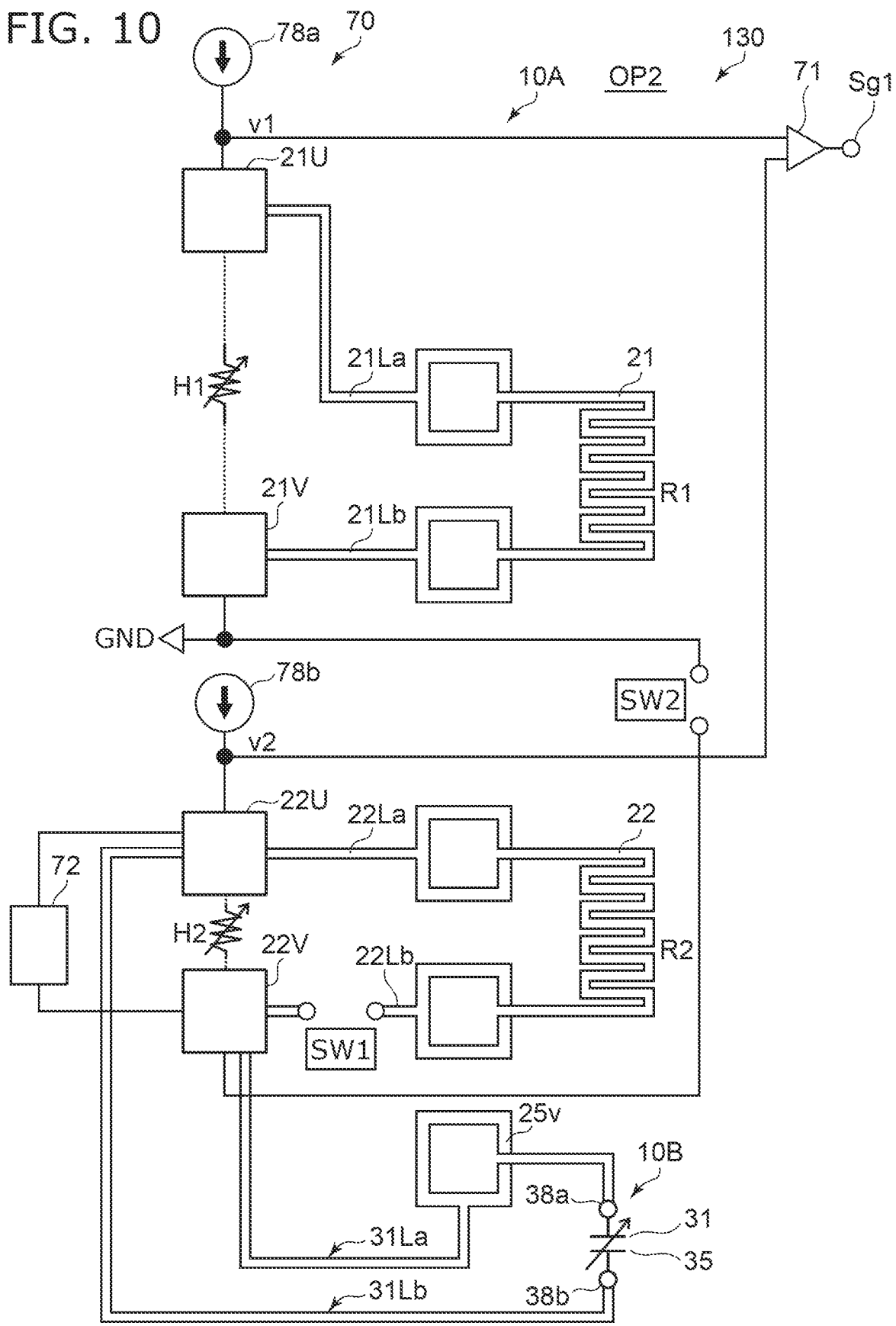
FIG. 10 is a schematic plan view illustrating one of multiple operations in the sensor according to the third embodiment.

FIG. 10 is a schematic plan view illustrating one of multiple operations in the sensor according to the third embodiment.

FIG. 10 corresponds to a second operation OP2. The second operation OP2 corresponds to a capacitance measurement mode. As shown in FIG. 10, in the second operation OP2, the first switch SW1 and the second switch SW2 are in a non-conducting state. At this time, the second resistance element 22 is insulated from the second other electrode 22V. The second other electrode 22V is insulated from the fixed potential GND. In the second operation OP2, a change in the capacitance in the second sensor part 10B is detected. For example, the change in the capacitance is detected by the capacitance detector 72. The change in the capacitance is the change in the capacitance between the fixed electrode 35 and the movable electrode 31. The change in the capacitance changes depending on the substance to be detected (for example, hydrogen). In the second operation OP2, the first value corresponding to the concentration of the substance to be detected is derived, and the first value is corrected based on the first signal Sg1. The corrected second value is output from, for example, the controller 70.

Figure 11:
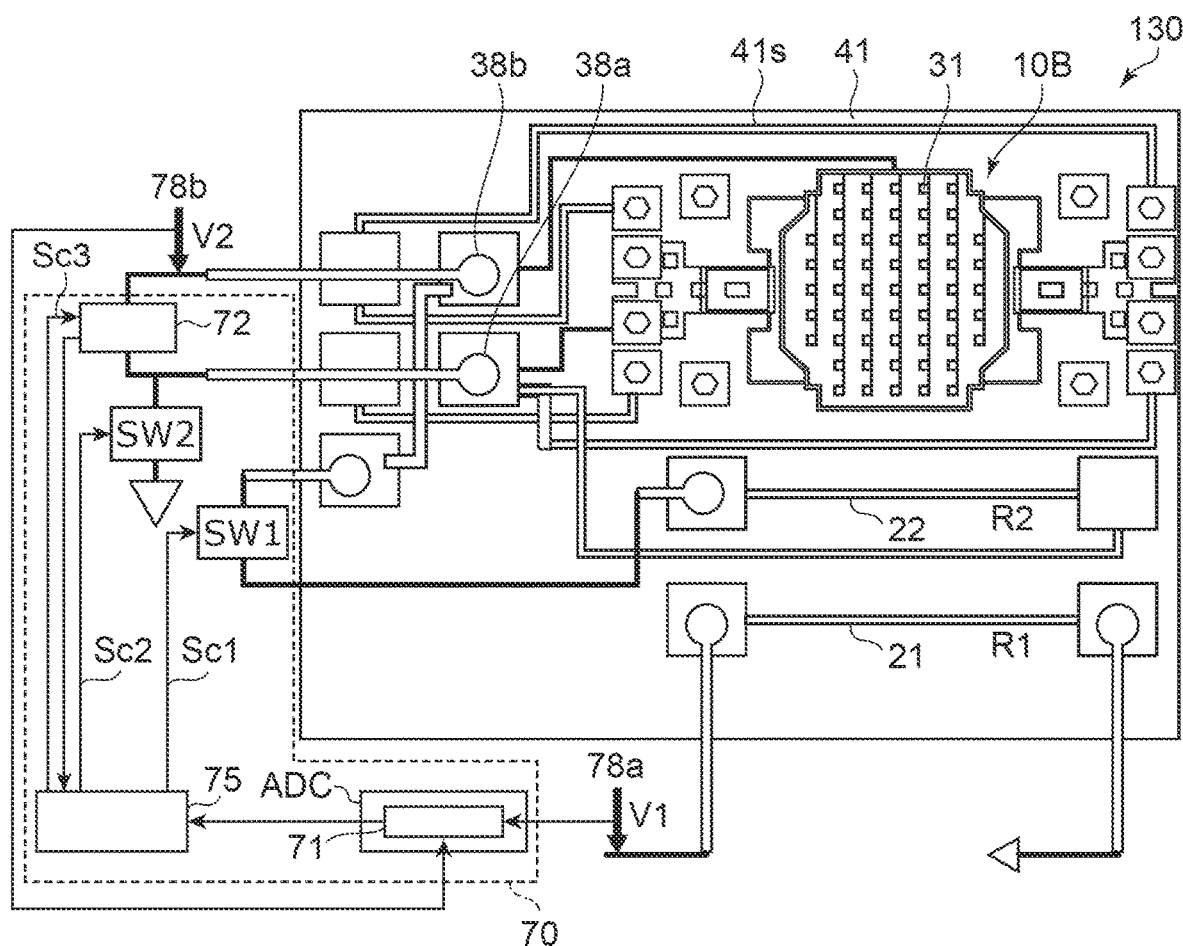
FIG. 11 is a schematic plan view illustrating the sensor according to the third embodiment.

FIG. 11 is a schematic plan view illustrating the sensor according to the third embodiment.

As shown in FIG. 11, in the sensor 130, the controller 70 may include a control circuit 75. The control circuit 75 supplies a first control signal Sc1 to the first switch SW1. The opening/closing operation of the first switch SW1 is controlled by the first control signal Sc1. The control circuit 75 supplies a second control signal Sc2 to the second switch SW2. The opening/closing operation of the second switch SW2 is controlled by the second control signal Sc2. The control circuit 75 may supply a third control signal Sc3 to the capacitance detector 72. The operation of the capacitance detector 72 is controlled by the third control signal Sc3.

As shown in FIG. 11, the controller 70 may include the differential circuit 71. The first voltage v1 and the second voltage v2 are input to the differential circuit 71. The output of the differential circuit 71 may be supplied to the control circuit 75. The differential circuit 71 may be included in, for example, an ADC (Analog-to-digital Converter). In this example, the controller 70 includes the capacitance detector 72, the first switch SW1 and the second switch SW2.

In the embodiment, the first value before correction (the value corresponding to the capacitance between the fixed electrode 35 and the movable electrode 31) greatly increases as humidity increases. On the other hand, the corrected second value does not substantially change even if humidity changes. By the correction, the substance to be detected can be detected with high accuracy by suppressing the influence of humidity.

Figure 12:
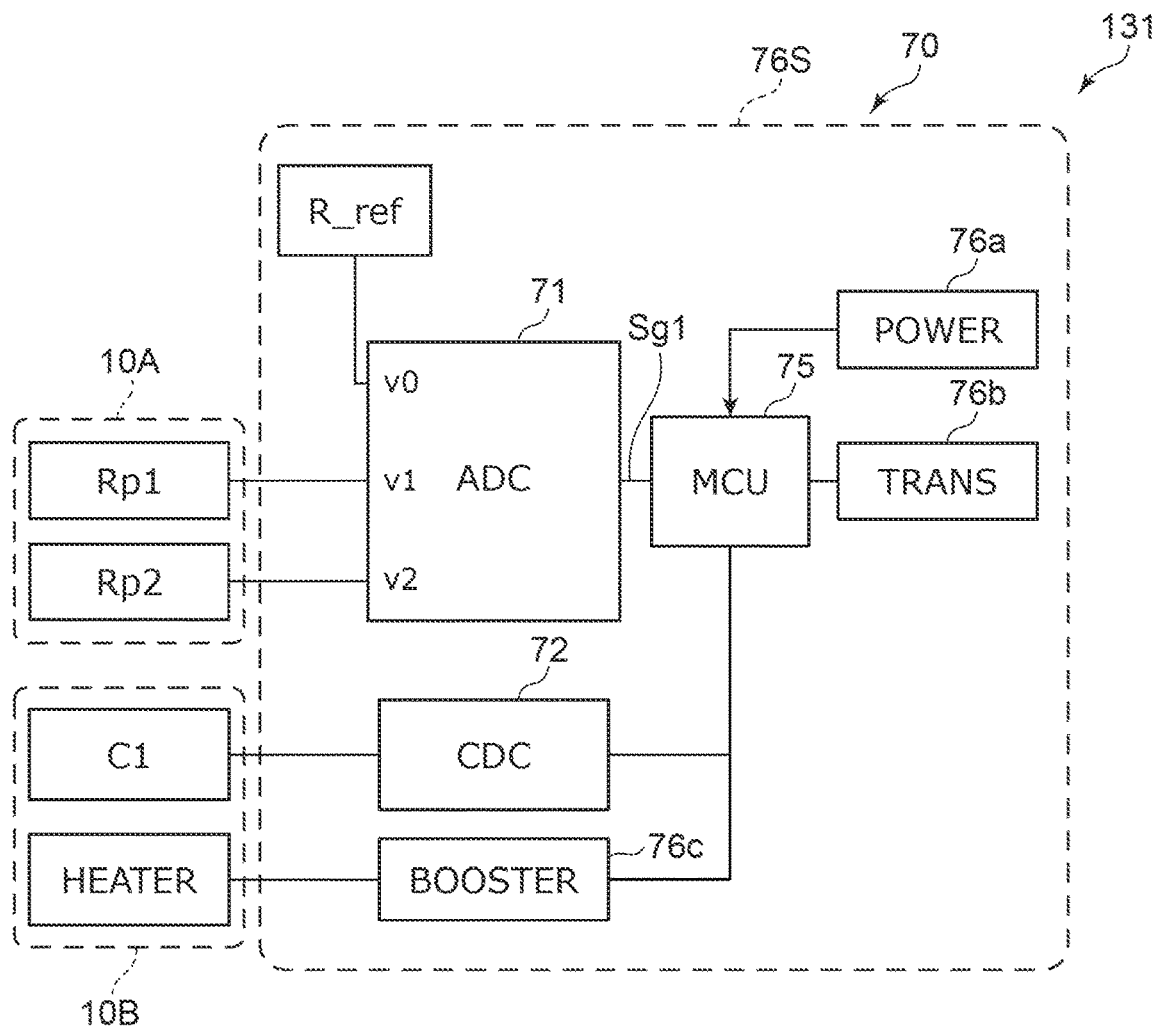
FIG. 12 is a block diagram illustrating a sensor according to the third embodiment.

FIG. 12 is a block diagram illustrating a sensor according to the third embodiment.

As shown in FIG. 12, in a sensor 131 according to the embodiment, the first electrical resistance Rp1 and the second electrical resistance Rp2 are provided in the first sensor part 10A. In the second sensor part 10B, a first capacitance C1 is provided between the fixed electrode 35 and the movable electrode 31. The heater (heater 32H: see FIG. 8) is provided in the second sensor part 10B.

In the example shown in FIG. 12, for example, the controller 70 is provided on a module board 76S. As shown in FIG. 12, the controller 70 includes an ADC. The ADC includes, for example, the differential circuit 71. The first voltage v1 corresponding to the first electrical resistance Rp1 and the second voltage v2 corresponding to the second electrical resistance Rp2 are input to the ADC (differential circuit 71). For example, humidity is detected by detecting the difference between the first voltage v1 and the second voltage v2. For example, humidity is detected by detecting the difference between the first electrical resistance Rp1 and the second electrical resistance Rp2.

For example, a voltage v0 of a reference resistance "R_ref" may be input to the ADC. A temperature coefficient of the reference resistance "R_ref" is low. For example, the temperature is detected by detecting a difference between the voltage v0 and the first voltage v1. For example, the temperature is detected by detecting a difference between the reference resistance "R_ref" and the first electrical resistance Rp1. The reference resistance "R_ref" and the first electrical resistance Rp1 correspond to a temperature sensor, for example. The detection result may be corrected by the temperature detected by the temperature sensor.

The controller 70 includes, for example, an MCU (Micro Computer Unit). The first signal Sg1 output from the ADC is supplied to the MCU. The MCU may correspond to, for example, the control circuit 75.

The controller 70 includes, for example, a CDC (Capacitance-to-digital Converter). The CDC converts the change in the first capacitance C1 into a digital signal. The CDC corresponds to a part of the capacitance detector 72.

The signal (first value) output from the CDC is supplied to the MCU. In the MCU, the first value is corrected and the second value is output based on the first signal Sg1. The first signal Sg1 may include information on humidity and information on temperature. The first value may be corrected and the second value may be output based on at least any one of temperature or humidity.

As shown in FIG. 12, the controller 70 may include a power supply circuit 76a. The controller 70 may include a communication circuit 76b. The communication circuit 76b may include a wireless transmission/reception circuit. The controller 70 may include a booster circuit 76c. A current may be supplied to the heater from the booster circuit 76c. In the embodiment, the booster circuit 76c may be omitted. For example, a current may be supplied to the heater from the output unit of the MCU.

The following sequence of operations may be performed on the sensor 131.

For example, in the first step, the temperature is detected by measuring the difference between the first voltage v1 and the voltage v0 of the reference resistance "R_ref". In the second step, the parasitic resistance is detected based on the difference between the first voltage v1 and the second voltage v2. The first signal Sg1 is generated. In the third step, a current is supplied to the heater 32H, and the temperature of the connection portion 32 is raised.

In the embodiment, for example, moisture is not substantially adsorbed on a portion other than the surface of the sensor. For example, only fluctuations due to moisture adsorption between pads are detected. For example, an analog wiring included in the sensor may be sandwiched between the ground layers (metal layer). As a result, moisture adsorption can be suppressed around the analog wiring.

Figure 13:
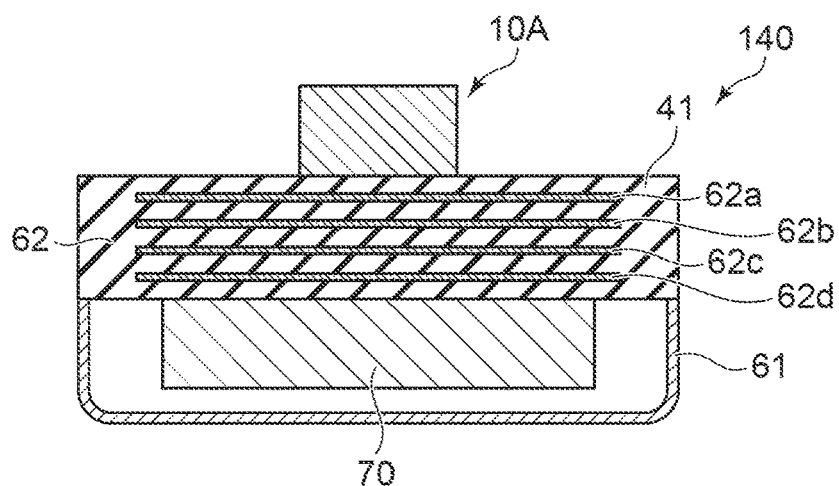
FIG. 13 is a schematic cross-sectional view illustrating a sensor according to the embodiment.

FIG. 13 is a schematic cross-sectional view illustrating a sensor according to the embodiment.

As shown in FIG. 13, a sensor 140 according to the embodiment includes a container 61 and a circuit board 62 in addition to the first sensor part 10A. At least a part of the controller 70 is sealed by the container 61 and the circuit board 62. For example, at least any one of the CDC or ADC included in the controller 70 is sealed by the container 61 and the circuit board 62. Also in this case, the first electrode 21U, the first other electrode 21V, the second electrode 22U, and the second other electrode 22V are not covered with the container 61 and the circuit board 62.

The circuit board 62 may include, for example, a first ground layer 62a, an analog signal layer 62b, a second ground layer 62c, a digital signal layer 62d, and the like. These layers may be provided in the insulating member 41. The analog signal layer 62b, the second ground layer 62c, and the digital signal layer 62d are provided between the first ground layer 62a and the container 61. Noise is more suppressed.

According to the embodiment, it is possible to provide a sensor capable of improving the detection performance.

The embodiments may include the following configurations (e.g., technological proposals).

Configuration 1

A sensor, comprising:
  a first sensor part including
    an insulating member,
    a first element part including
      a first resistance element including a first resistance end portion and a first other resistance end portion, and covered with the insulating member,
      a first electrode electrically connected to the first resistance end portion, and not covered with the insulating member, and
      a first other electrode electrically connected to the first other resistance end portion, and not covered with the insulating member, and
    a second element part including
      a second resistance element including a second resistance end portion and a second other resistance end portion, and covered with the insulating member,
      a second electrode electrically connected to the second resistance end portion, and not covered with the insulating member, and
      a second other electrode electrically connected to the second other resistance end portion, and not covered with the insulating member,
  a second distance between the second electrode and the second other electrode being shorter than a distance between the first electrode and the first other electrode.

Configuration 2
   A sensor, comprising:
   a first sensor part including
      an insulating member,
      a first element part including
         a first resistance element including a first resistance end portion and a first other resistance end portion, and covered with the insulating member,
         a first electrode electrically connected to the first resistance end portion, and not covered with the insulating member, and
         a first other electrode electrically connected to the first other resistance end portion, and not covered with the insulating member, and
      a second element part including
         a second resistance element including a second resistance end portion and a second other resistance end portion, and covered with the insulating member,
         a second electrode electrically connected to the second resistance end portion, and not covered with the insulating member, and
         a second other electrode electrically connected to the second other resistance end portion, and not covered with the insulating member,
      the insulating member including
         a first insulating region between the first electrode and the first other electrode, and
         a second insulating region between the second electrode and the second other electrode,
      the insulating member including
         a first material of the first insulating region, and
         a first contact angle of the first insulating region with respect to water, and
      the insulating member including at least any one of
         a second material of the second insulating region, the second material being different from the first material, or
         a second contact angle of the second insulating region with respect to water, the second contact angle being smaller than the first contact angle.

Configuration 3
   The sensor according to Configuration 1, wherein
   a contact angle of the second material with respect to water is smaller than a contact angle of the first material with respect to water.

Configuration 4
   The sensor according to Configuration 3, wherein
   the first material includes at least any one of fluorine or an alkyl group.

Configuration 5
   The sensor according to any one of Configurations 1 to 4, wherein
      the second electrode includes
         a second electrode base, and
         a plurality of second electrode protrusions electrically connected to the second electrode base, and
      at least a part of the second other electrode is between one of the plurality of second electrode protrusions and an other one of the plurality of second electrode protrusions.

Configuration 6
   The sensor according to Configuration 5, wherein
      the second other electrode includes
         a second other electrode base, and
         a plurality of second other electrode protrusions electrically connected to the second other electrode base, and
      the one of the plurality of second electrode protrusions is between one of the plurality of second other electrode protrusions and an other one of the plurality of second other electrode protrusions.

Configuration 7
   The sensor according to any one of Configurations 1 to 6, wherein
      an electrical resistance of the first resistance element is not less than 0.9 times and not more than 1.1 times an electrical resistance of the second resistance element.

Configuration 8
   The sensor according to any one of Configurations 1 to 6, wherein
      an electrical resistance of the second resistance element is not less than 1 kΩ and not more than 20 kΩ.

Configuration 9
   The sensor according to any one of Configurations 1 to 8, wherein
      at least any one of the first electrode, the first other electrode, the second electrode, or the second other electrode includes at least one selected from the group consisting of Pd, Au, Pt, and Al.

Configuration 10
   The sensor according to any one of Configurations 1 to 9, wherein
      at least any one of the first resistance element or the second resistance element includes TiN.

Configuration 11
   The sensor according to any one of Configurations 1 to 10, wherein
      the first sensor part further includes
         a first electrode wiring electrically connecting the first resistance end portion to the first electrode,
         a first other electrode wiring electrically connecting the first other resistance end portion to the first other electrode,
         a second electrode wiring electrically connecting the second resistance end portion to the second electrode, and
         a second other electrode wiring electrically connecting the second other resistance end portion to the second other electrode, and
      at least any one of the first electrode wiring, the first other electrode wiring, the second electrode wiring, or the second other electrode wiring includes Al.

Configuration 12
   The sensor according to any one of Configurations 1 to 11, wherein
      the insulating member includes silicon and at least one selected from the group consisting of oxygen and nitrogen.

Configuration 13
   The sensor according to any one of Configurations 1 to 12, wherein
      a second electrical resistance between the second electrode and the second other electrode changes depending on a change of humidity in a space around the first sensor part, and
      a first electrical resistance between the first electrode and the first other electrode does not change depending on the change of the humidity, or a first change rate of the first electrical resistance to the change of the humidity is lower than a second change rate of the second electrical resistance to the change of the humidity.

Configuration 14

The sensor according to Configuration 13, further comprising:
  a controller,
  the controller including
    a first supply circuit supplying a first current to the first resistance element via the first electrode and the first other electrode,
    a second supply circuit supplying a second current to the second resistance element via the second electrode and the second other electrode, and
    a differential circuit,
  the differential circuit including
    a first input part to which a first voltage between the first electrode and the first other electrode is input,
    a second input part to which a second voltage between the second electrode and the second other electrode is input, and
    an output part outputting a first signal corresponding to a difference between the first voltage and the second voltage.

Configuration 15

The sensor according to Configuration 14, further comprising:
  a second sensor part,
  the second sensor part including
    a base body,
    a fixed electrode fixed to the base body,
    a support portion fixed to the base body
    a movable electrode supported by the support portion,
    a first void being provided between the fixed electrode and the movable electrode,
  the controller further including a capacitance detector,
  the capacitance detector outputting a first value corresponding to a capacitance between the fixed electrode and the movable electrode, and
  the controller being configured to output a second value obtained by correcting the first value using the first signal.

Configuration 16

The sensor according to Configuration 15, wherein
  the first value changes depending on substance to be detected included in a space around the second sensor part.

Configuration 17

The sensor according to Configuration 16, wherein
  a first distance between the fixed electrode and the movable electrode changes depending on a concentration of the substance in the space.

Configuration 18

The sensor according to Configuration 17, wherein
  the second sensor part further includes a connection portion supported by the support portion and supporting the movable electrode, and
  the connection portion being deformable depending on the concentration of the substance.

Configuration 19

The sensor according to any one of Configurations 1 to 18, further comprising:
  a container; and
  a circuit board,
  at least a part of the controller being sealed by the container and the circuit board, and
  the first electrode, the first other electrode, the second electrode, and the second other electrode being not covered with the container and the circuit board.

In the specification, "electrically connected" includes a case of being connected via other conductive member or the like other than a case of being connected by direct contact.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as sensor parts, resistance elements, electrodes, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
  a first sensor part including
    an insulating member,
    a first element part including
      a first resistance element including a first resistance end portion and a first other resistance end portion, and covered with the insulating member,
      a first electrode electrically connected to the first resistance end portion, and not covered with the insulating member, and
      a first other electrode electrically connected to the first other resistance end portion, and not covered with the insulating member, and a second element part including
      a second resistance element including a second resistance end portion and a second other resistance end portion, and covered with the insulating member,
      a second electrode electrically connected to the second resistance end portion, and not covered with the insulating member, and a second other electrode electrically connected to the second other resistance end portion, and not covered with the insulating member,
a second distance between the second electrode and the second other electrode being shorter than a distance between the first electrode and the first other electrode,
wherein
the first sensor part further includes
a first electrode wiring electrically connecting the first resistance end portion to the first electrode,
a first other electrode wiring electrically connecting the first other resistance end portion to the first other electrode,
a second electrode wiring electrically connecting the second resistance end portion to the second electrode, and
a second other electrode wiring electrically connecting the second other resistance end portion to the second other electrode, and
at least any one of the first electrode wiring, the first other electrode wiring, the second electrode wiring, or the second other electrode wiring includes Al.

2. The sensor according to claim 1, wherein
the second electrode includes
a second electrode base, and
a plurality of second electrode protrusions electrically connected to the second electrode base, and
at least a part of the second other electrode is between one of the plurality of second electrode protrusions and an other one of the plurality of second electrode protrusions.

3. The sensor according to claim 2, wherein
the second other electrode includes
a second other electrode base, and
a plurality of second other electrode protrusions electrically connected to the second other electrode base, and
the one of the plurality of second electrode protrusions is between one of the plurality of second other electrode protrusions and an other one of the plurality of second other electrode protrusions.

4. The sensor according to claim 1, wherein
an electrical resistance of the first resistance element is not less than 0.9 times and not more than 1.1 times an electrical resistance of the second resistance element.

5. The sensor according to claim 1, wherein
an electrical resistance of the second resistance element is not less than 1 kΩ and not more than 20 kΩ.

6. The sensor according to claim 1, wherein
at least any one of the first electrode, the first other electrode, the second electrode, or the second other electrode includes at least one selected from the group consisting of Pd, Au, Pt, and Al.

7. The sensor according to claim 1, wherein
at least any one of the first resistance element or the second resistance element includes TiN.

8. The sensor according to claim 1, wherein
the insulating member includes silicon and at least one selected from the group consisting of oxygen and nitrogen.

9. The sensor according to claim 1, wherein
a second electrical resistance between the second electrode and the second other electrode changes depending on a change of humidity in a space around the first sensor part, and
a first electrical resistance between the first electrode and the first other electrode does not change depending on the change of the humidity, or a first change rate of the first electrical resistance to the change of the humidity is lower than a second change rate of the second electrical resistance to the change of the humidity.

10. The sensor according to claim 9, further comprising:
a controller,
the controller including
a first supply circuit supplying a first current to the first resistance element via the first electrode and the first other electrode,
a second supply circuit supplying a second current to the second resistance element via the second electrode and the second other electrode, and
a differential circuit,
the differential circuit including
a first input part to which a first voltage between the first electrode and the first other electrode is input,
a second input part to which a second voltage between the second electrode and the second other electrode is input, and
an output part outputting a first signal corresponding to a difference between the first voltage and the second voltage.

11. The sensor according to claim 10, further comprising:
a second sensor part,
the second sensor part including
a base body,
a fixed electrode fixed to the base body,
a support portion fixed to the base body
a movable electrode supported by the support portion,
a first void being provided between the fixed electrode and the movable electrode,
the controller further including a capacitance detector,
the capacitance detector outputting a first value corresponding to a capacitance between the fixed electrode and the movable electrode, and
the controller being configured to output a second value obtained by correcting the first value using the first signal.

12. The sensor according to claim 11, wherein
the first value changes depending on substance to be detected included in a space around the second sensor part.

13. The sensor according to claim 12, wherein
a first distance between the fixed electrode and the movable electrode changes depending on a concentration of the substance in the space.

14. The sensor according to claim 13, wherein
the second sensor part further includes a connection portion supported by the support portion and supporting the movable electrode, and
the connection portion being deformable depending on the concentration of the substance.

15. The sensor according to claim 10, further comprising:
a container; and
a circuit board,
at least a part of the controller being sealed by the container and the circuit board, and
the first electrode, the first other electrode, the second electrode, and the second other electrode being not covered with the container and the circuit board.

16. A sensor, comprising:
a first sensor part including
an insulating member,
a first element part including
a first resistance element including a first resistance end portion and a first other resistance end portion, and covered with the insulating member,
a first electrode electrically connected to the first resistance end portion, and not covered with the insulating member, and
a first other electrode electrically connected to the first other resistance end portion, and not covered with the insulating member, and a second element part including
a second resistance element including a second resistance end portion and a second other resistance end portion, and covered with the insulating member,
a second electrode electrically connected to the second resistance end portion, and not covered with the insulating member, and
a second other electrode electrically connected to the second other resistance end portion, and not covered with the insulating member,
the insulating member including
a first insulating region between the first electrode and the first other electrode, and
a second insulating region between the second electrode and the second other electrode,
the insulating member including
a first material of the first insulating region, and
a first contact angle of the first insulating region with respect to water, and the insulating member including at least any one of
a second material of the second insulating region, the second material being different from the first material, or
a second contact angle of the second insulating region with respect to water, the second contact angle being smaller than the first contact angle,
wherein
the first sensor part further includes
a first electrode wiring electrically connecting the first resistance end portion to the first electrode,
a first other electrode wiring electrically connecting the first other resistance end portion to the first other electrode,
a second electrode wiring electrically connecting the second resistance end portion to the second electrode, and
a second other electrode wiring electrically connecting the second other resistance end portion to the second other electrode, and
at least any one of the first electrode wiring, the first other electrode wiring, the second electrode wiring, or the second other electrode wiring includes Al.

17. The sensor according to claim 16, wherein
a contact angle of the second material with respect to water is smaller than a contact angle of the first material with respect to water.

18. The sensor according to claim 17, wherein
the first material includes at least any one of fluorine or an alkyl group.

19. A sensor, comprising:
a first sensor part including
an insulating member,
a first element part including
a first resistance element including a first resistance end portion and a first other resistance end portion, and covered with the insulating member,
a first electrode electrically connected to the first resistance end portion, and not covered with the insulating member, and
a first other electrode electrically connected to the first other resistance end portion, and not covered with the insulating member, and a second element part including
a second resistance element including a second resistance end portion and a second other resistance end portion, and covered with the insulating member,
a second electrode electrically connected to the second resistance end portion, and not covered with the insulating member, and
a second other electrode electrically connected to the second other resistance end portion, and not covered with the insulating member,
a second distance between the second electrode and the second other electrode being shorter than a distance between the first electrode and the first other electrode,
wherein
a second electrical resistance between the second electrode and the second other electrode changes depending on a change of humidity in a space around the first sensor part, and
a first electrical resistance between the first electrode and the first other electrode does not change depending on the change of the humidity, or a first change rate of the first electrical resistance to the change of the humidity is lower than a second change rate of the second electrical resistance to the change of the humidity.

* * * * *